(12) United States Patent
Ichihara et al.

(10) Patent No.: US 6,583,578 B1
(45) Date of Patent: Jun. 24, 2003

(54) FIELD EMISSION-TYPE ELECTRON SOURCE AND MANUFACTURING METHOD THEREOF

(75) Inventors: Tsutomu Ichihara, Hirakata (JP); Takuya Komoda, Sanda (JP); Koichi Aizawa, Neyagawa (JP); Yoshiaki Honda, Kyoto (JP); Yoshifumi Watabe, Tondabayashi (JP); Takashi Hatai, Neyagawa (JP)

(73) Assignee: Matsushita Electric Works, Ltd., Osaka (JP)

( * ) Notice: Subject to any disclaimer, the term of this patent is extended or adjusted under 35 U.S.C. 154(b) by 197 days.

(21) Appl. No.: 09/688,874

(22) Filed: Oct. 17, 2000

(30) Foreign Application Priority Data

Oct. 18, 1999 (JP) .............................. 11-295955

(51) Int. Cl.[7] ................................. G09G 3/10
(52) U.S. Cl. ...................... 315/169.3; 313/310; 445/50
(58) Field of Search ................ 313/310, 309, 313/311, 495, 496; 315/169.3; 445/24, 50, 51

(56) References Cited

U.S. PATENT DOCUMENTS

| | | | |
|---|---|---|---|
| 5,672,938 A | * | 9/1997 | Jones |
| 5,747,918 A | * | 5/1998 | Eom et al. ............... 315/169.3 |
| 5,936,257 A | | 8/1999 | Kusunoki et al. .......... 257/10 |
| 5,990,605 A | * | 11/1999 | Yoshikawa et al. ........ 313/309 |
| 6,023,124 A | | 2/2000 | Chuman et al. ............ 313/310 |
| 6,249,080 B1 | * | 6/2001 | Komoda et al. ........... 313/310 |
| 6,285,118 B1 | * | 9/2001 | Hatai et al. ................ 313/310 |
| 6,384,541 B1 | * | 5/2002 | Ohnishi et al. ........... 315/169.3 |

FOREIGN PATENT DOCUMENTS

| | | |
|---|---|---|
| EP | A20797233 | 9/1997 |
| EP | 0865064 | 9/1998 |
| JP | 7-130282 | 5/1995 |
| JP | 9-320456 | 12/1997 |
| JP | 10269932 | 10/1998 |
| JP | 10-308166 | 11/1998 |

\* cited by examiner

*Primary Examiner*—Don Wong
*Assistant Examiner*—Ephrem Alemu
(74) *Attorney, Agent, or Firm*—Greenblum & Bernstein, P.L.C.

(57) ABSTRACT

An electron source (10) is provided with an n-type silicon substrate (1) as a conductive substrate, a drift layer (6) composed of oxidized porous polycrystalline silicon which is formed on the main surface of the silicon substrate (1), and a surface electrode (7) as a conductive thin film formed on the drift layer (6). The process for forming the surface electrode (7) includes the steps of forming a first layer composed of Cr on the drift layer (6), forming a second layer composed of Au on the first layer, and alloying the two layers. The surface electrode (7) has higher adhesion for the drift layer 6 and/or stability for the lapse of time. In addition, the surface electrode (7) has lower density of states in an energy region near energy of emitted electrons, in comparison with the simple substance of Cr. In the surface electrode (7), scattering of the electrons is less so that electron emitting efficiency is higher.

26 Claims, 8 Drawing Sheets

FIELD EMISSION-TYPE ELECTRON SOURCE AND MANUFACTURING METHOD THEREOF

BACKGROUND OF THE INVENTION

1. Field of the Invention

The present invention relates to a field emission-type electron source for emitting electron beams by means of electrical field emission and to a manufacturing method thereof.

2. Description of the Prior Art

The inventors of the present application have already proposed a field emission-type electron source having an electrically conductive substrate, a thin metal film (surface electrode) and a strong electric field drift layer interposed between the conductive substrate and the thin metal film. The strong electric field drift layer, through which electrons injected thereto from the conductive substrate can drift, is formed by rapidly and thermally oxidizing a porous polycrystalline semi conductor layer (for example, a polycrystalline silicon layer which was made porous, namely a porous polysilicon layer) by means of a rapid thermal oxidation (RTO) process.

For example, as shown in FIG. 9, a field emission-type electron source 10' (hereinafter, merely referred to "electron source 10'") is provided with an n-type silicon substrate 1 as the conductive substrate. On the main surface of the n-type silicon substrate 1, a strong electric field drift layer 6 (hereinafter, merely referred to "drift layer 6") composed of an oxidized porous polycrystalline silicon layer (porous polysilicon layer) is formed. On the drift layer 6, a surface electrode 7' composed of a thin metal film is formed. In addition, on the back surface of the n-type silicon layer 1, an ohmic electrode 2 is formed.

Where the electron source 10' shown in FIG. 9 is used, the surface electrode 7' is disposed in a vacuum circumstance while a collector electrode 21 is disposed so as to face the surface electrode 7', as shown in FIG. 10. Then a DC voltage Vps is applied between the surface electrode 7' and the n-type silicon substrate 1 (ohmic electrode 2) in such a manner that the surface electrode 7' has a positive electrical potential against the n-type silicon substrate 1. On the other hand, a DC voltage Vc is applied between the collector electrode 21 and the surface electrode 7' in such a manner that the collector electrode 21 has a positive electrical potential against the surface electrode 7'. Thus the electrons injected into the drift layer 6 from the n-type silicon substrate 1 drift through the drift layer 6, and then emitted outward from the surface electrode 7' (chain lines in FIG. 10 showing flows of the electrons e⁻ emitted from the surface electrode 7'). Therefore it may be preferable that the surface electrode 7' is composed of a material having a smaller work function.

In the electron source 10', the current flowing between the surface electrode 7' and the ohmic electrode 2 is referred to "diode current Ips". On the other hand, the current flowing between the collector electrode 21 and the surface electrode 7' is referred to "emitted electron current Ie". The larger the ratio of the emitted electron current Ie to the diode current Ips (Ie/Ips) becomes, the higher the electron-emitting efficiency becomes. In the electron source 10', even if the DC voltage Vps applied between the surface electrode 7' and the ohmic electrode 2 is such a lower one as about 10 to 20V, the electrons can be emitted. According to the electron source 10', the electron-emitting property less depends on the degree of the vacuum. In addition, a popping phenomenon does not occur when the electrons are emitted. In consequence, the electrons can be stably emitted with higher electron-emitting efficiency.

As shown in FIG. 11, it may be considered that the drift layer 6 includes at least polycrystalline silicon columns 51, thin silicon oxide films 52, fine crystalline silicon particles 63 of nanometer order scale and silicon oxide films 64 acting as insulating layers. The thin silicon oxide films 52 are formed on the surfaces of the polycrystalline silicon columns 51. The fine crystalline silicon particles 63 are interposed among the polycrystalline silicon columns 51. The silicon oxide films 64, each of which has the thickness smaller than the crystalline particle diameter of the fine silicon particle 63, are formed on the surfaces of the fine crystalline silicon particles 63.

That is, in the drift layer 6, it may be considered that the surface portion of each of the grains is made porous while the inner portion (core) of the grain maintains a crystalline state. Therefore the most part of the electrical field, which is applied to the drift layer 6, may be applied to the silicon oxide films 64. In consequence, the injected electrons are accelerated among the polycrystalline silicon columns 51 by the strong electric field applied to the silicon oxide films 64, and then drift in the direction of the arrow A in FIG. 11 (upward in FIG. 11) toward the surface of the drift layer 6. Thus the electron emitting efficiency may be improved. Hereupon, it may be considered that the electrons, which have reached the surface of the drift layer 6, are hot electrons so that they easily tunnel the surface electrode 7', and then are emitted into the vacuum circumstance. The thickness of the surface electrode 7' may be set to about 10 to 15 nm.

Meanwhile, in order to improve the electron emitting efficiency of the above-mentioned electron source 10', it is necessary to restrain the electrons from scattering in the surface electrode 7'. Therefore the surface electrode 7' is required to have characteristics as follows. That is, the surface electrode 7' must restrain the electrons from scattering in the thin metal film thereof. In addition, it must have higher adhesion with the under layer (drift layer 6 in the above-mentioned case) not so as to cause its peeling during the photolithography process, the annealing process or the like. So it may be suggested such an electron source in that the surface electrode 7' is composed of a first metal layer formed on the drift layer 6 and a second metal layer formed on the first metal layer, the two layers being stratified (stacked) together. Hereupon the first metal layer is composed of a metal material with higher adhesion while the second metal layer is composed of a metal material in which the electrons less scatter. In the above-mentioned electron source, however, it may be caused such a disadvantage that the electrons highly scatter in the surface electrode 7' as same as the case that the surface electrode 7' is composed of only one metal material in which the electrons highly scatter so that the electron emitting efficiency may be lowered, because the electrons highly scatter in the metal material with higher adhesion (probability of scattering being larger). In addition, it may be caused such a disadvantage that if the surface electrode 7' is peeled off from the drift layer 6 during the manufacturing process thereof, its yield is lowered to increase its cost while its stability for the lapse of time and reliability may be lowered. The above-mentioned disadvantages may occur also in other field emission-type electron sources, for example, such as a MIM (Metal Insulator Metal) type one or a MOS (Metal Oxide Semiconductor) type one.

SUMMARY OF THE INVENTION

The present invention, which has been achieved to solve the above-mentioned problems, has an object to provide an inexpensive field emission-type electron source having good stability for the lapse of time, in which the deterioration of electron emitting efficiency due to scattering of the electrons is less, and to Provide a manufacturing method of the field emission-type electron source.

A field emission-type electron source (hereinafter, merely referred to "electron source") according to the present invention which is performed to achieve the above-mentioned object, includes an electrically conductive substrate (hereinafter, merely referred to "conductive substrate"), a strong electric field drift layer (hereinafter, merely referred to "drift layer") formed on a surface of the conductive substrate, and an electrically conductive thin film (hereinafter, merely referred to "conductive thin film") formed on the drift layer. In the electron source, electrons injected into the drift layer from the conductive substrate, drift in the drift layer to be emitted outward through the conductive thin film by applying a voltage between the conductive thin film and the conductive substrate in such a manner that the conductive thin film acts as a positive electrode against the conductive substrate. Hereupon, the conductive thin film has low density of states in an energy region near energy of the emitted electrons, and at least one of high adhesion for the drift layer and high sublimation enthalpy.

In the electron source, the electron emitting efficiency may be improved because the electrons, which have drifted in the drift layer, less scatter. In addition, it may be prevented that the conductive thin film is peeled off from the drift layer. In consequence, the stability for the lapse of time, of the electron source may be improved while the yield of the electron source may be raised. Therefore the cost of the electron source may be lowered.

In the above-mentioned electron source, it is preferable that the conductive thin film is composed of a metal layer including at least two metal materials, in which electrons in d-orbits of the metal materials produce a hybrid orbit so as to lower density of states of the metal layer in the energy region near energy of the emitted electrons. In this case, the conductive thin film may have lower density of states in the energy region near energy of the emitted electrons so that the electrons may be more effectively restrained from scattering.

It is more preferable that the metal layer includes a first metal material having at least one of high adhesion for the drift layer and high sublimation enthalpy, and a second metal material whose density of states in the energy region near energy of the emitted electrons is lower than that of the first material. Hereupon, the density of states of the metal layer in the energy region near energy of the emitted electrons may be also lower than that of the first material.

In the electron source, the drift layer may be composed of a porous material. It is preferable that the porous material includes, at least, polycrystalline silicon columns, fine crystalline silicon particles of nanometer order scale interposed among the polycrystalline silicon columns, and insulating films formed on surfaces of the fine crystalline silicon particles, each of the insulating films having a thickness smaller than the crystalline particle diameter of the fine silicon particle. In this case, the electron emitting property less depends on the vacuum in the circumstance while the popping phenomenon may not be caused when the electrons are emitted. In consequence, the electrons may be stably emitted with higher efficiency.

In the electron source, it is preferable that the metal layer includes a metal material having high adhesion for the drift layer and/or high sublimation enthalpy. In this case, the stability for the lapse of time, of the conductive thin film itself may be improved.

In the electron source, it is most preferable that the metal layer includes a metal material in which a first metal, which has high adhesion for the drift layer and/or high sublimation enthalpy, and a second metal, whose density of states in the energy region near energy of the emitted electrons is low, are mixed together in an atomic level to form an alloy, or chemically combined together to form a compound.

In the most preferable electron source, the electron emitting efficiency may be highly improved because the electrons, which have drifted in the drift layer, hardly scatter. In addition, it may be effectively prevented that the conductive thin film is peeled off from the drift layer. Therefore, the stability for the lapse of time and yield of the electron source may be highly improved.

In the electron source, the metal layer may include at least Au or at least Cr. If it includes Au, the electron source may have higher resistance to oxidation and higher stability for the lapse of time. On the other hand, if the conductive thin film includes Cr, it may have higher adhesion for the drift layer.

According to another aspect of the present invention, there is provided an electron source including (i) a first electrode, (ii) a surface electrode composed of an electrically conductive thin film, the surface electrode acting as a second electrode, (iii) and a drift layer disposed between the first electrode and the surface electrode, in which electrons pass through from the first electrode to the surface electrode due to an electrical field which is generated when an voltage is applied between the first electrode and the surface electrode in such a manner that the surface electrode has a higher electrical potential in comparison with the first electrode. Hereupon, the electrically conductive thin film includes a first material having at least one of high adhesion for the drift layer and high sublimation enthalpy, and a second material whose density of states in the energy region near energy of the emitted electrons is lower than that of the first material, the density of states of the thin film in the energy region near energy of the emitted electrons being lower than that of the first material.

A method of manufacturing the above-mentioned most preferable electron source includes the steps of attaching at least the first and second metals to the drift layer, and performing a stabilizing treatment for alloying or chemically combining the first and second metals together to form the metal layer.

The conductive thin film of the electron source manufactured by the method may have such higher adhesion that it is not peeled off during the manufacturing process, for example during the photolithography process. In addition, the conductive thin film may have higher electron emitting efficiency. Therefore the electron source may have excellent stability for the lapse of time while the cost of the electron source may be lowered. Moreover, it is possible to use a material composed of a simple substance during the film forming process. Therefore it is not necessary to consider the composition of the materials during the film forming process. In consequence, the cost of the electron source may be further lowered while the manufacturing process may be simplified.

In the above-mentioned method, the stabilizing treatment may be performed by applying UV rays to a surface of the metal disposed at an outermost position. In this case, the first and second metals may be alloyed or chemically combined without causing a breakdown of the device.

The stabilizing treatment may be performed while applying ozone to the surface of the metal disposed at the outermost position. In this case, also, the first and second metals may be alloyed or chemically combined without causing a breakdown of the device. In addition, it may be prevented that the electron emitting efficiency is lowered due to contamination by organic substances. Therefore the electron source may have much higher electron emitting efficiency.

Further, the stabilizing treatment may be performed by applying UV rays to a surface of the metal disposed at the outermost position while heating the first and second metals. In this case, the time, which is required for alloying or chemically combining the first and second metals, may be shortened. Therefore its throughput may be improved.

Moreover, the stabilizing treatment is performed by applying UV rays and ozone to the surface of the metal disposed at the outermost position while heating the first and second metals. In this case, the metal layer may be prevented from being contaminated by organic substances. In consequence, it may be prevented that the electron emitting efficiency is lowered due to the contamination by the organic substances. Therefore the electron emitting efficiency of the electron source may be more highly improved.

In the above-mentioned method, the first and second metals may be attached to the drift layer by stratifying the first and second metals onto the drift layer. For example, the first and second metals may be stratified using an alternate sputtering process or a vapor deposition process. In this case, as the film forming process, it is possible to utilize a general process which has been used in the process for manufacturing semiconductor.

Hereupon, the stratified first metal may be formed on the drift layer while the stratified second metal is formed at a position nearest to the surface electrode, during the stratifying step.

Meanwhile, in the above-mentioned method, the first and second metals may be attached to the drift layer in such a state that the first and second metals are mixed together. For example, the first and second metals may be attached to the drift layer by simultaneously sputtering or depositing the first and second metals onto the drift layer. In this case, the conductive thin film of the electron source may have such higher adhesion that it is not peeled off during the manufacturing process, for example during the photolithography process. In addition, the conductive thin film may have higher electron emitting efficiency. Therefore the electron source may have an excellent stability with the lapse of time while the cost of the electron source may be lowered. If the sputtering or depositing process is used, the time required for the film forming process may be shortened. In consequence, its throughput may be improved so that its manufacturing cost may be lowered.

Another method of manufacturing the above-mentioned most preferable electron source includes the step of attaching vapor or fine particles made from a source or target in which the first and second metals have been alloyed or chemically combined, to the drift layer to thereby form the metal layer. For example, the fine particles or vapor of the target may be attached to the drift layer by sputtering or depositing the target onto the drift layer. In this case, the conductive thin film of the electron source may have such higher adhesion that it is not peeled off during the manufacturing process, for example during the photolithography process. In addition, the conductive thin film may have a higher electron emitting efficiency. Therefore the electron source may have excellent stability for the lapse of time while the cost of the electron source may be lowered. Moreover, if the sputtering or depositing process is used, the time required for the film forming process may be shortened. In consequence, its throughput may be improved so that its manufacturing cost may be lowered.

A further method of manufacturing the above-mentioned most preferable electron source includes the step of attaching at least the first and second metals, which are formed in such small sizes that the first and second metals car be naturally alloyed or chemically combined together, to the drift layer to form the metal layer. For example, the first and second metals may be attached to the drift layer in such a state that thin layers of the first metal and thin layers of the second metal are alternately stratified, or that fine particles of the first metal and fine particles of the second metal are mixed together. In this case, the conductive thin film of the electron source may have such higher adhesion that it is not peeled off during the manufacturing process, for example during the photolithography process. In addition, the conductive thin film may have higher electron emitting efficiency. Therefore the electron source may have excellent stability with the lapse of time while the cost of the electron source may be lowered. Moreover, the time required for the film forming process may be shortened. In consequence, its throughput may be improved so that its manufacturing cost may be lowered.

BRIEF DESCRIPTION OF THE DRAWINGS

The present invention will become more fully understood from the detailed description given below and the accompanied drawings.

DETAILED DESCRIPTION OF THE PREFERRED EMBODIMENTS

This application is based on the application No. 11-295955 filed in Japan, the content of which is herein expressly incorporated by reference in its entirety.

Hereinafter, preferred embodiments of the present invention will be concretely described.

In order to improve the electron emitting efficiency of the electron source (field emission-type electron source), it is necessary to reduce scattering of the electrons in the surface electrode composed of an electrically conductive thin film, as described above. On the other hand, it has been known that scattering of the electrons within metals is so called electron-electron scattering. Meanwhile, it has been also reported that the electron-electron scattering is less in a metal material whose density of states in the energy region near energy of the emitted electrons is lower, according to the Fermi level. As simple substances corresponding to the above-mentioned metal material, Au, Ag or Cu have been known. However, in each of these metal materials, there exists such a disadvantage that its adhesion or heat resistance is worse while its durability for the manufacturing process is lower.

Thus the electron source according to the present invention is characterized in that the surface electrode as the conductive thin film includes a first material which has at least one of high adhesion for the drift layer and high sublimation enthalpy, and a second material whose density of states in the energy region near energy of the emitted electrons is lower than that of the first material. In consequence, the density of states in the energy region near energy of the emitted electrons, of the surface electrode becomes lower in comparison with that of the first material.

First Embodiment

Figure 1:
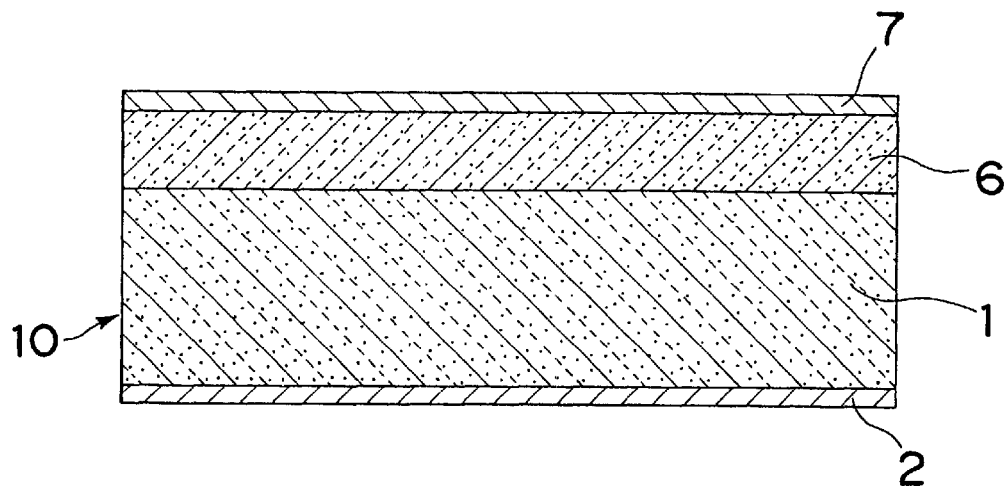
FIG. 1 is a sectional elevation view of a field emission-type electron source (hereinafter, merely referred to "electron source") according to the present invention.
Figure 9:
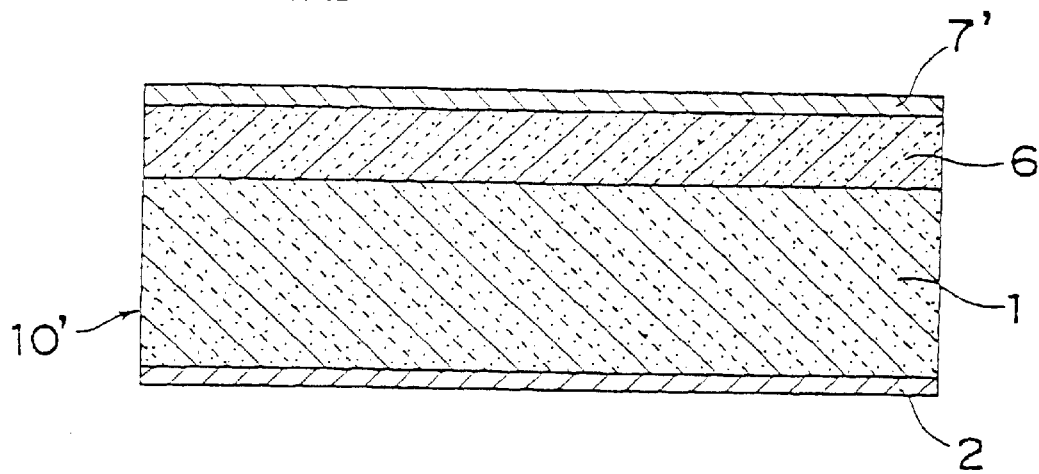
FIG. 9 is a sectional elevation view of a conventional field emission-type electron source, which is a base of the electron source according to the present invention.
Figure 10:
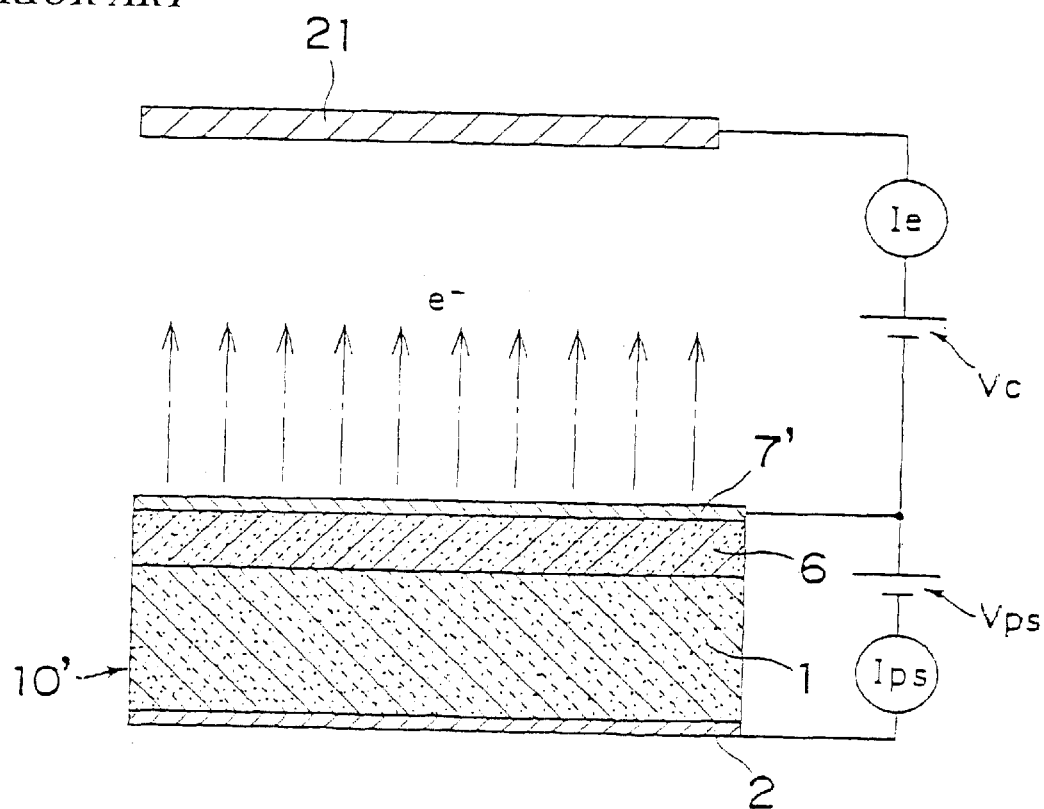
FIG. 10 is a schematic view explaining the principle of the electron-emitting mechanism in the electron source shown in FIG. 9

As shown in FIG. 1, an electron source 10 (field emission-type electron source) according to the present embodiment fundamentally has the same construction as that of the above-mentioned conventional electron source 10' shown in FIG. 9. That is, the electron source 10 is provided with an n-type silicon substrate 1 as the conductive substrate. On the main surface (one of the surfaces) of the n-type silicon substrate 1, a drift layer 6 (strong electric field drift layer) composed of an oxidized porous polycrystalline silicon layer (porous polysilicon layer) is formed. On the drift layer 6, a surface electrode 7 composed of a thin metal film is formed. In addition, on the back surface of the n-type silicon layer 1, an ohmic electrode 2 is formed.

Hereupon, in the surface electrode 7, Cr is used as the first material having high adhesion for the drift layer 6 and/or high sublimation enthalpy which is higher than that of Au. In addition, Au is used as the second material whose density of states in the energy region near energy of the emitted electrons is lower than that of the first material (Cr). In consequence, the density of states in the energy region near energy of the emitted electrons, of the surface electrode 7 is lower in comparison with that of the first material (Cr).

Figure 2D:
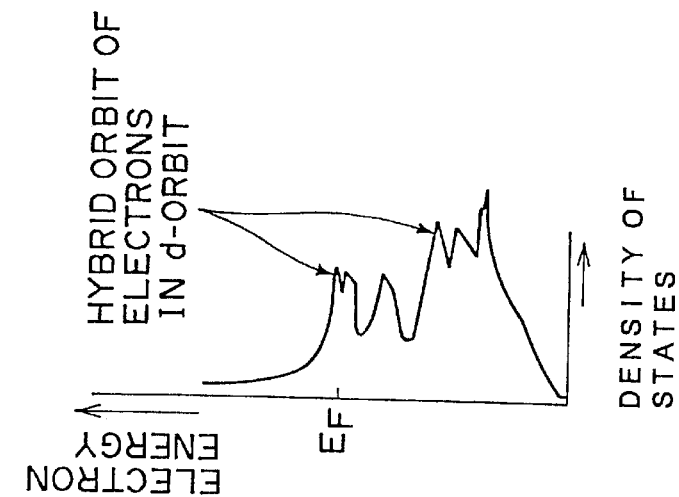
FIGS. 2B, 2C and 2D are graphs showing state densities of Cr, Au and a surface electrode in the electron source shown in FIG. 1, respectively.
Figure 2C:
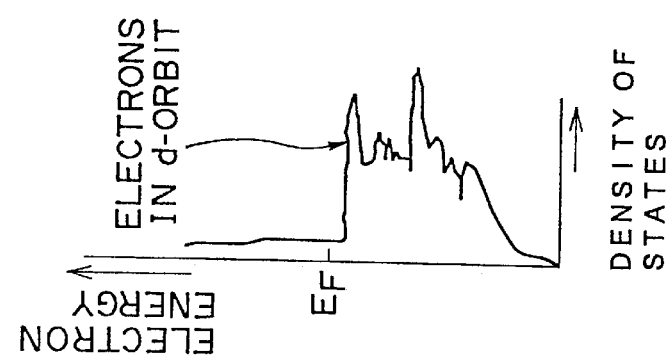
Figure 2B:
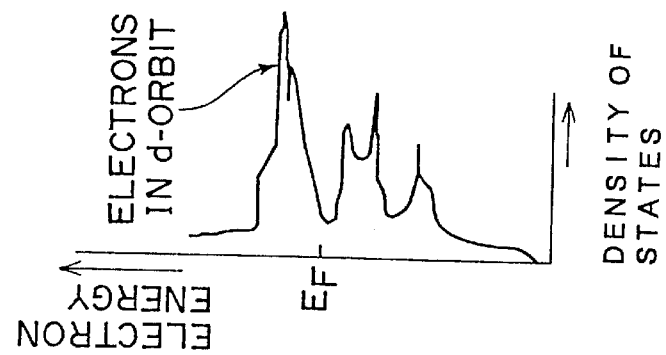
Figure 2A:
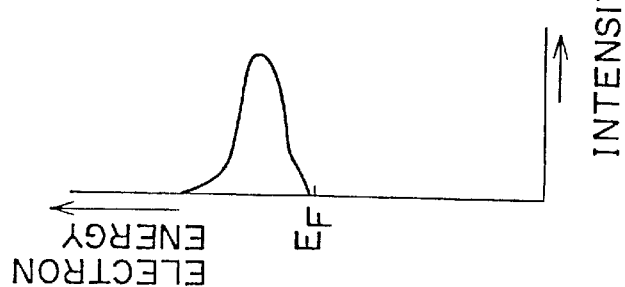
FIG. 2A is a graph showing distribution of energy of emitted electrons.

FIG. 2A shows distribution of energy of the electrons emitted through the surface electrode 7. FIGS. 2B, 2C and 2D show the state densities of a simple substance of Cr as the first material, a simple substance of Au as the second material and the surface electrode 7 according to the present embodiment, respectively. In FIGS. 2A to 2D, the symbol "$E_F$" denotes a Fermi level. As apparent from FIGS. 2A to 2D, Cr has higher density of states in the energy region near energy of the emitted electrons so that scattering of the electrons therein may be larger. Therefore the electron emitting efficiency may be lowered, if a first layer composed of Cr and a second layer composed of Au are simply stratified (stacked) on the drift layer 6 in order to improve adhesion of the surface electrode 7.

On the other hand, as apparent from FIGS. 2A to 2D, in the present embodiment, the density of states in the energy region near energy of the emitted electrons, of the surface electrode 7 shown in FIG. 2D is lower than the density of states of the simple substance of Cr shown in FIG. 2B. Meanwhile, the distribution of the density of states of the surface electrode 7 is different from that of the simple substance of Au shown in FIG. 2C. That is, in the surface electrode 7, the electrons in the d-orbit of each of the Cr and Au constructing the surface electrode 7 produce a hybrid orbit. Thus, in the surface electrode 7, a further d-orbit, which is different from the d-orbit of each of the Cr and Au, is formed so that the density of states of the electrons in the d-orbit of each of the Cr and Au is lowered, as shown in FIG. 2D. In short, the surface electrode 7 includes the electrically conductive metal material in which at least the first material (Cr in the present embodiment), which has high adhesion for the drift layer 6 and/or high sublimation enthalpy, and the second material (Au in the present embodiment), whose density of states in the energy region near energy of the emitted electrons is lower than that of the first material, are mixed together in an atomic level to form an alloy (or chemically combined together to form a compound).

Thus, in the electron source 10 according to the present embodiment, because the density of states in the energy region near energy of the emitted electrons, of the surface electrode 7 is lower than that of Cr as the first material, the electrons which have drifted in the drift layer 6, may be less scattered in the surface electrode 7. In consequence, the electron emitting efficiency of the electron source 10 may be improved. In addition, it may be prevented that the surface electrode 7 is peeled off from the drift layer 6. Consequently the stability for the lapse of time, of the electron source 10 may be improved while the yield of the electron source 10 may be raised. Therefore the cost of the electron source 10 may be lowered. In the electron source 10 according to the present embodiment, the n-type silicon substrate 1 as the conductive substrate acts as one electrode while the surface electrode 7 as the conductive thin film acts as the other electrode.

Hereinafter, a process for manufacturing the electron source 10 will be described while referring to FIGS. 3A to 3E.

Figure 3A:
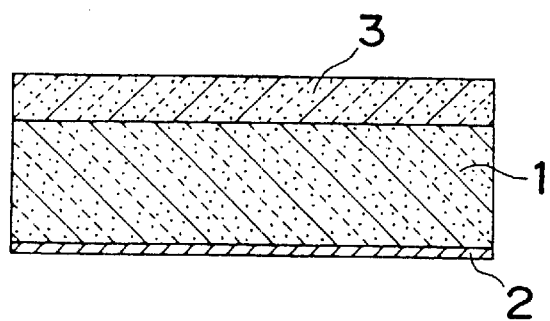
FIGS. 3A to 3E are sectional elevation views showing intermediate products or a final product in the main steps of the process for manufacturing the electron source shown in FIG. 1.

According to the process, after an ohmic electrode 2 has been formed on the back surface of an n-type silicon substrate 1 at first, a non-doped polycrystalline silicon layer 3 as a semiconductor layer having predetermined thickness (for example, 1.5 μm) is formed on the surface of the n-type silicon substrate 1 so that the structure shown in FIG. 3A is obtained. The film making process of the polycrystalline silicon layer 3 may be performed using, for example, the LPCVD process or sputtering process. Alternatively, the film making process may be performed by annealing an amorphous silicon film so as to be crystallized, the amorphous silicon film having been formed by the plasma CVD process.

Figure 3B:
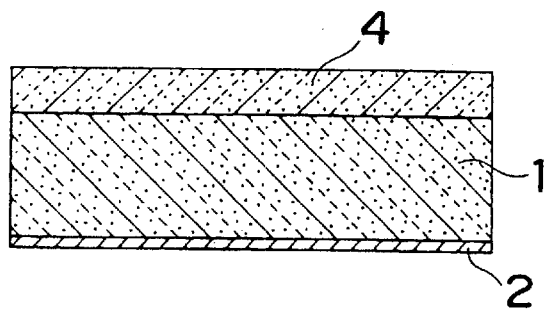

After the non-doped polycrystalline silicon layer 3 has been formed, a porous polycrystalline silicon layer 4 is formed by performing an anodic oxidation treatment to the polycrystalline silicon layer 3 using an anodic oxidation processing tank containing electrolyte composed of a mixture in which hydrogen fluoride aqueous solution of 55wt % and ethanol are mixed together in the ratio of nearly 1:1. The anodic oxidation treatment is performed with constant current while applying light to the layer 3 in such a manner that a platinum electrode (not shown) acts as a negative electrode and the n-type silicon substrate 1 (ohmic electrode 2) acts as a positive electrode. Thus, the structure shown in FIG. 3B is obtained.

Figure 3C:
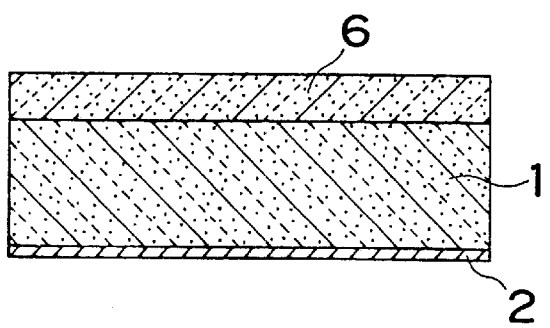

After the anodic oxidation treatment has been completed, hydrogen atoms combined to the outermost surface of the porous polycrystalline silicon layer 4 are released by a heat treatment. Then a drift layer 6 is formed by oxidizing the porous polycrystalline silicon layer 4 by means of an annealing treatment. Thus the structure shown in FIG. 3C is obtained. In short, according to the present embodiment, after the hydrogen atoms terminating the silicon atoms in the porous polycrystalline silicon layer 4 have been released by the above-mentioned heat treatment when the porous polycrystalline silicon layer 4 is formed by means of the anodic oxidation treatment, the porous polycrystalline silicon layer 4 is oxidized by means of the annealing treatment.

Figure 11:
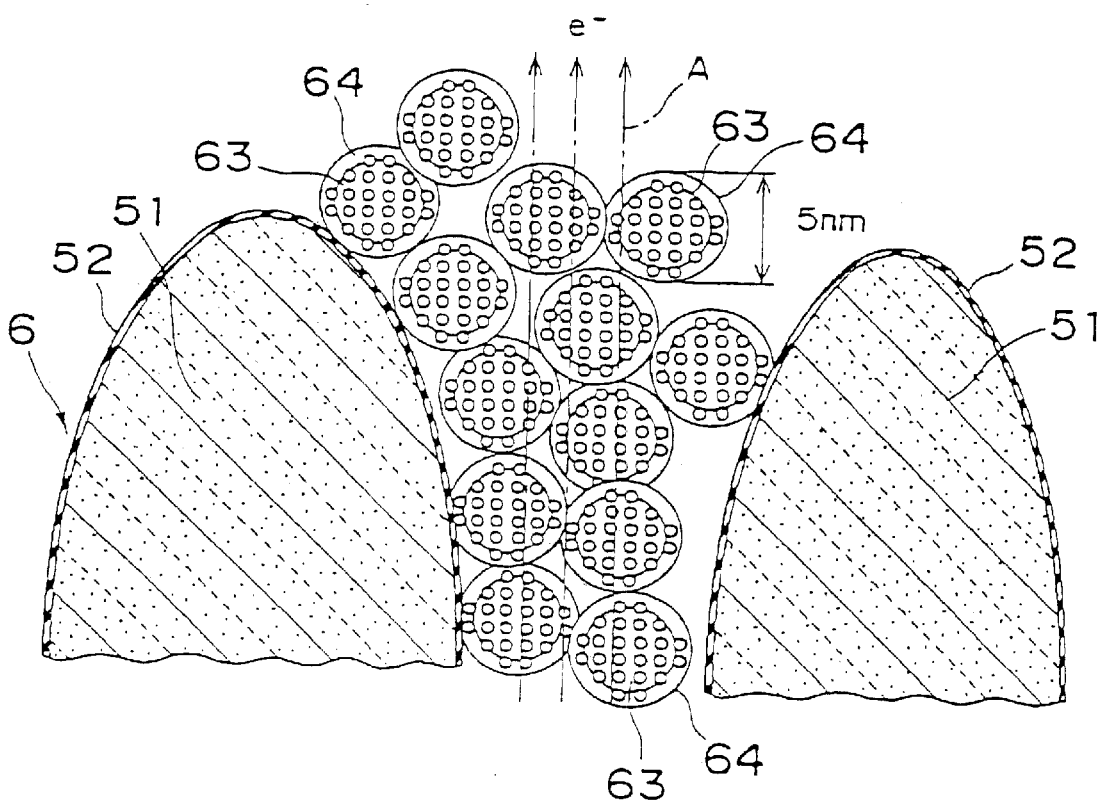
FIG. 11 is a schematic view explaining the electron-emitting mechanism in the drift layer of the electron source shown in FIG. 9.

As described above with reference to FIG. 11, the drift layer 6 includes at least polycrystalline silicon columns 51 (grains), thin silicon oxide films 52, fine crystalline silicon particles 63 of nanometer order scale and silicon oxide films 64 acting as insulating layers. The thin silicon oxide films 52 are formed on the surfaces of the polycrystalline silicon columns 51. The fine crystalline silicon particles 63 are interposed among the polycrystalline silicon columns 51. The silicon oxide films 64, each of which has thickness smaller than the crystalline particle diameter of the fine silicon particle 63, are formed on the surfaces of the fine crystalline silicon particles 63.

Figure 3D:
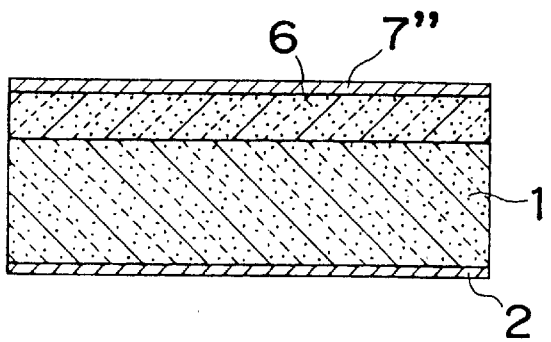

After that, in order to for surface electrode 7 on the drift layer 6, there are formed, by turns, a first layer composed of Cr as the first material and a second layer composed of Au as the second material on the drift layer 6 by means of the sputtering process. Thus an intermediate film 7" (film to be processed) composed of the first and second layers is formed so that the structure shown in FIG. 3D is obtained. Hereupon, the first layer of the intermediate film 7" is formed on the drift layer 6, while the second layer is stacked on the first layer. Although the first and second layers are formed by means of the sputtering process in the present embodiment, it may be formed by means of a vacuum deposition process. Cr used as the material of the first layer has higher adhesion For the drift layer 6 and higher sublimation enthalpy in comparison with Au, while Au used as the material of the second layer has excellent resistance to oxidation and stability for the lapse of time.

If the intermediate film 7" is used instead of the surface electrode 7' in the conventional electron source 10' (see FIG. 9), scattering of the electrons in the film may be larger as same as the case that only the metal material, in which scattering of the electrons is larger, is used as described above. In consequence, the electron emitting efficiency may become lower.

Thus, in the present embodiment, there is provided such a stabilizing process that the first layer composed of Cr as the first material and the second layer composed of Au as the second material, which are in the stratified (stacked) state, are melted together so as to be mutually mixed together at an atomic level so that the both metals are alloyed. In order to alloy the both metals, it is necessary to provide high energy to the intermediate film 7". In the present embodiment, energy is provided by applying UV rays to the film. That is, when the UV rays are applied to the intermediate film 7" of a stratified state, the temperature of the film is raised to become a melted state so that Au and Cr mutually diffuses to be alloyed. On that occasion, breakdown of the device due to the heat may not be caused, because the energy of the applied UV rays is absorbed near the surface of the film.

Figure 3E:
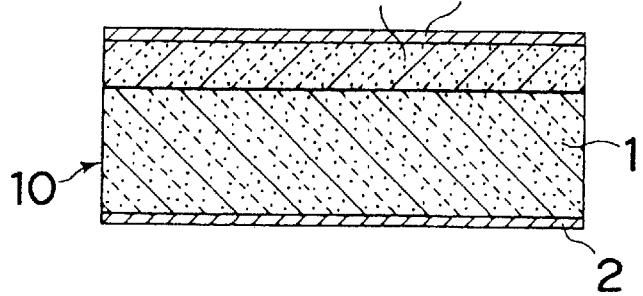

By performing the stabilizing process for alloying the metals as described above, there is obtained an electron source 10 having a surface electrode 7 composed of the alloyed conductive material as shown in FIG. 3E.

In the alloyed surface electrode 7, each of the properties of Au and Cr partially remains. In consequence, the surface electrode 7 may have higher adhesion for the surface of a porous material such as the drift layer 6 composed of a porous polycrystalline silicon layer. In result, the surface electrode 7 may not be peeled off from the drift layer 6 during the manufacturing process, for example during the photolithography process or the like. In addition, the surface electrode 7 may have high stability for the lapse of time, while scattering of the electrons may become less. In consequence, it may prevented that its electron emitting efficiency is lowered. Therefore it may be possible to achieve, for example, a FED display having a larger screen by assembling the electron sources 10 according to the present embodiment so as to construct a matrix.

Because the intermediate film 7" has a stratified construction of two layers as described above, it may be possible to use a material composed of a single element during the film forming process by means of the sputtering process or vacuum deposition process. In this case, the manufacturing process may be simplified, because it is not necessary to consider deviation of component ratio of the materials or the like. In addition, it may be expected to improve the uniformity of the surface electrode 7 in the lateral direction (namely, uniformity in the same plane).

Because the metal material of the first layer (Cr in the present embodiment) has high adhesion for the drift layer 6 in comparison with Au even in the condition that the intermediate film 7" is in the stratified state of two layers, the durability for the manufacturing process becomes high. Therefore it is possible to perform processes such as the patterning process or the like before alloying the intermediate film 7". In addition, because the intermediate film maintains the high adhesion for the drift layer 6 after it has been alloyed, it is possible to perform processes such as the process for patterning the surface electrode 7 or the like after having alloyed the intermediate film 7". In general, materials with higher adhesion have a higher density of states in energy region near the emitted electrons in comparison with the Fermi level. Therefore it may be desirable to use a material, whose density of states in energy region near the emitted electrons is lower, in a layer except the first layer formed directly on the drift layer 6, in order to lower its density of states in energy region near the emitted electrons after having alloyed the intermediate film 7".

In the above-mentioned manufacturing process, on the occasion that the surface electrode 7 is formed, the two metals are alloyed or chemically combined by the stabilizing process after the intermediate film 7" has been formed. However, the surface electrode 7 may be formed by stratifying (stacking), by turns, at least a first unit layer composed of the first material (for example, layer having thickness corresponding to a layer of several atoms) and a second unit layer composed of the second material (for example, layer having thickness corresponding to a layer of several atoms), each of the layers having such very small thickness that the unit layers car be naturally alloyed or chemically combined together. Alternatively, the surface electrode 7 may be formed by mixing at least the first material and the second material in such a manner that the materials can be naturally alloyed or chemically combined together. In each of the above-mentioned cases, the surface electrode 7 of the electron source 10 may have such higher adhesion that it is not peeled off during the manufacturing process, for example during the photolithography process. In addition, the surface electrode 7 may have higher electron emitting efficiency. Therefore the electron source 10 may have excellent stability for the lapse of time while the cost of the electron source 10 may be lowered. Moreover the time required for the film forming process may be shortened. In consequence, its throughput may be improved so that its manufacturing cost may be lowered.

Although the n-type silicon substrate is used as the conductive substrate in the electron source 1C according to the present embodiment, there may be used such a conductive substrate in that a conductive layer is formed on a plate made of glass such as non-alkali glass or low-alkali glass.

Second Embodiment

In the case of the above-mentioned first embodiment, UV rays are applied to the surface of the intermediate film 7" in the stabilizing process in order to melt the first material of the first layer (for example, Cr) and the second material of the second layer (for example, Au), the layers constituting the intermediate film 7". Meanwhile, in the case of the present second embodiment, the n-type silicon substrate 1 is heated by means of a heater (not shown) while applying UV rays to its surface, in the stabilizing process, so that the process for alloying the metals is promoted. On that occasion, the higher the heating temperature becomes, the shorter the time required for alloying the metals becomes so that the throughput may be improved. However, the heating temperature must be set in consideration of heat resistance of the entire device including the conductive substrate. It is preferable that the heating temperature is set below or equal to 400° C., if there is used such a conductive substrate in that a conductive layer is formed on a plate made of glass such as non-alkali glass or low-alkali glass. If the above-mentioned conductive substrate is used, the electron emitting area may be made larger, for example, in comparison with the case using the silicon substrate.

Third Embodiment

If the outermost surface of the surface electrode 7 is contaminated with organic substances, the electron emitting efficiency is lowered even in the case that the alloyed surface electrode 7 is used as the above-mentioned first or second embodiment.

In the case that the substrate is heated as the second embodiment, particularly, it may be feared that the contamination by the organic substances is further promoted. Thus, in the present third embodiment, when the stabilizing process for alloying the metals is performed by applying UV rays to the surface electrode 7 while heating the n-type silicon substrate 1 using the heater as same as the case of the second embodiment, ozone is simultaneously applied to the outermost surface of the intermediate film 7" to prevent the intermediate film 7" or surface electrode 7 from being contaminated with the organic substances.

In the electron source 10 having the surface electrode 7 which has been formed by alloying the intermediate film 7" while applying ozone thereto, it has been found that the electron emitting efficiency is improved by about double orders (double figures) in comparison with the case that UV is not applied. Further, in the surface electrode 7 formed by alloying the intermediate film 7" while applying ozone and UV rays thereto and heating the n-type silicon substrate 1, it has been confirmed that Au and Cr coexist in the same region, according to the analysis using a FE-TEM and an X-ray micro analyzer (XMA).

Figure 4A:
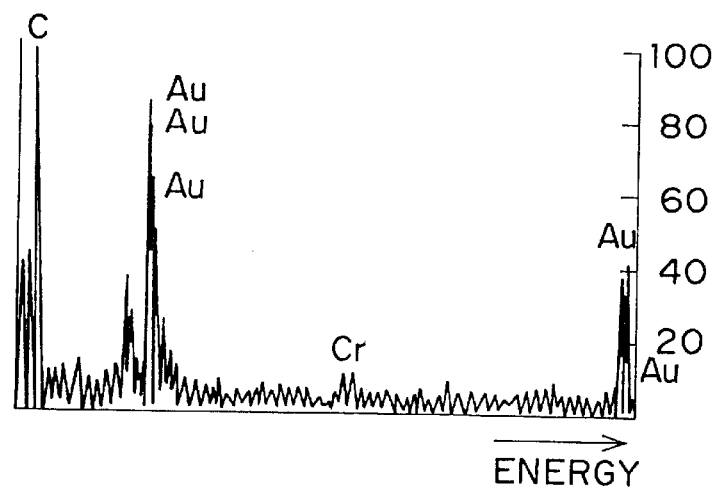
FIGS. 4A to 4C are graphs showing elemental compositions of the surface electrode of the electron source shown in FIG. 1 at the outermost, intermediate and innermost positions, respectively, the elemental compositions being obtained by means of the element analysis using XMA.
Figure 4B:
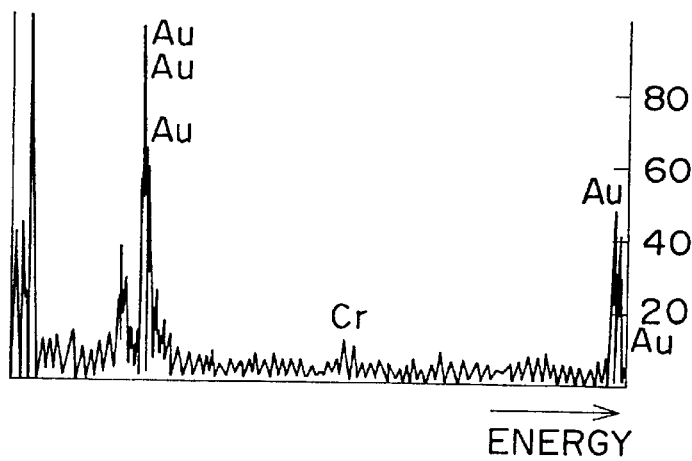
Figure 4C:
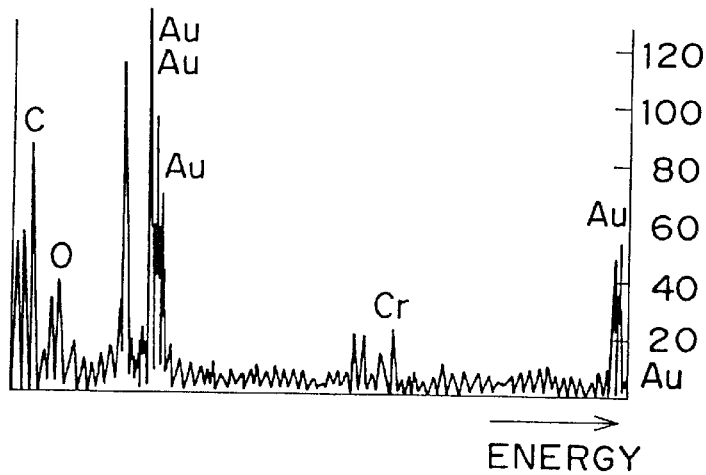
Figure 5A:
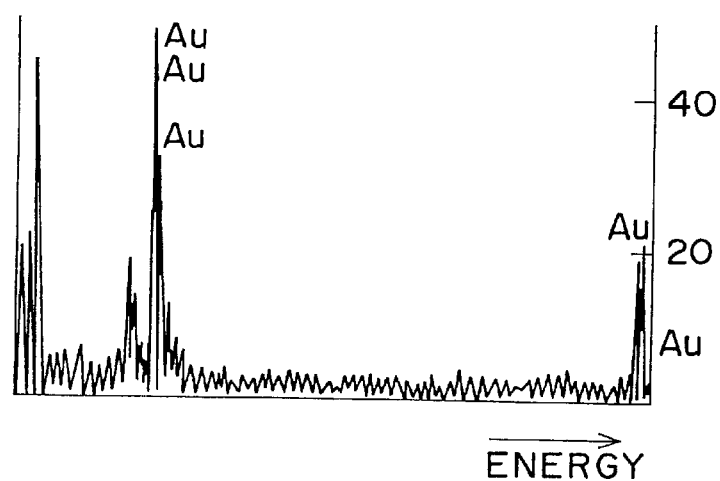
FIGS. 5A to 5C are graphs showing elemental compositions of a surface electrode prepared for a comparison use at the uppermost, intermediate and innermost positions, respectively, the elemental compositions being obtained by means of the element analysis using XMA.
Figure 5B:
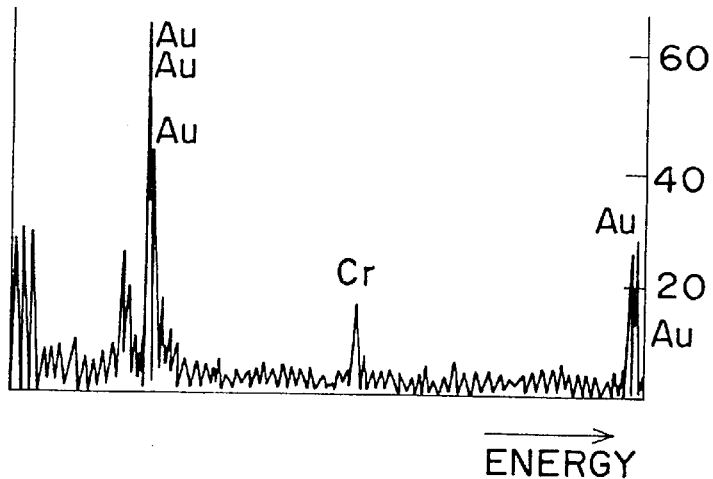
Figure 5C:
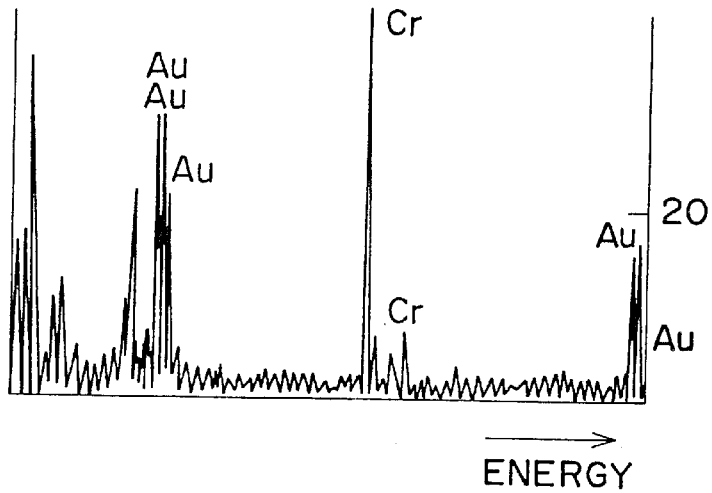

FIGS. 4A–4C show the results of the elemental analysis by means of the XMA, the analysis.being performed for the surface electrode 7 formed by alloying the intermediate film 7". On the other hand, FIGS. 5A–5C show the results of the elemental analysis performed for the non-alloyed intermediate film 7". Hereupon, the thickness of each of the surface electrode 7 and the intermediate film 7" was set to 100 Å. The thickness of the first layer composed of Cr (hereinafter, referred to "Cr layer"), of the intermediate film 7" was set to 20 Å, while the thickness of the second layer composed of Au (hereinafter, referred to "Au layer") was set to 80 Å.

The elemental analysis for the intermediate film 7" by means of the XMA was performed at three positions in the intermediate film 7" as follows. They were a surface position of the intermediate film 7", a position nearly corresponding to the interface between the Cr layer and the Au layer (Au layer side), and a bottom position in the Cr layer. FIG. 5A shows the result measured at the surface position of the intermediate film 7". FIG. 5B shows the result measured at the position nearly corresponding to the interface. FIG. 5C shows the result measured at the bottom position in the Cr layer. On the other hand, the elemental analysis for the surface electrode 7 by means of the XMA was performed at three positions corresponding to the above-mentioned three positions in the intermediate film 7" in the depth wise direction. That is, FIG. 4A shows the result measured at the surface of the surface electrode 7. FIG. 4B shows the result measured at the position nearly corresponding to the interface of the intermediate film 7". FIG. 4C shows the result measured at the position corresponding to the Cr layer of the intermediate film 7".

In each of FIGS. 4A–4C and 5A–5C, the horizontal axis denotes an energy level of X-rays emitted from a sample (surface electrode 7 or intermediate film 7"), while the vertical axis denotes a count value of X-ray generation due to each of the elements. Referring to FIG. 4A and FIG. 5A, each of which shows the result measured at the surface position, the following matters may be understood. That is, X-ray generation due to Cr is slightly detected in a region of a comparatively higher energy level as to the surface electrode 7, to which the stabilizing process was performed. On the other hand, X-ray generation due to Cr is not detected in the region of the above-mentioned energy level as to the intermediate film 7", to which the stabilizing process was not performed.

That is, in the surface electrode 7 to which the stabilizing process was performed, it may be understood that Cr in the Cr layer to which the stabilizing process had not been performed yet, slightly diffused into the Au layer to be alloyed with Au. On the other hand, in the intermediate film 7" to which the stabilizing process was not performed, it is of course that the element of Cr does not exist in the Au layer.

Referring to FIG. 4B and FIG. 5B, each of which shows the result measured at the position near the interface, the following matters may be understood. Hereupon, the samples were made by performing a sputter etching process to the upper surfaces of the surface electrode 7 and the intermediate film 7" till they were etched (removed) to the position corresponding to the interface between the Au layer and the Cr layer. As to each of the surface electrode 7 and the intermediate film 7", X-ray generation due to Cr is slightly detected in a region of a comparatively higher energy level. The reason why X-ray generation due to Cr is slightly detected as to the intermediate film 7" also, may be considered as follows. That is, the thickness of each of the deposited Cr and Au layers had a deviation. Further, the process for depositing the metal layers or for removing the Au layer by means of the sputter etching was not performed uniformly.

Referring to FIG. 4C and FIG. 5C, each of which shows the result measured at the position in the Cr layer, the following matters may be understood. Hereupon, the samples were made by performing a sputter etching process to the upper surfaces of the surface electrode 7 and the intermediate film 7" till they were etched (removed) to the position corresponding to the Cr layer. As to the surface electrode 7, X-ray generation due to Cr is slightly detected in a region of a comparatively higher energy level, while X-ray generation due to Au is highly detected in a region of a comparatively lower energy level. On the other hand, as to the intermediate film 7", X-ray generation due to Cr is highly detected in a region of a comparatively higher energy level, while X-ray generation due to Au is less detected in a region of a comparatively lower energy level in comparison with the case of the surface electrode 7. Therefore it may be understood that in the surface electrode 7, Au diffused into the Cr layer of the intermediate film 7" to be alloyed with Cr.

Figure 6:
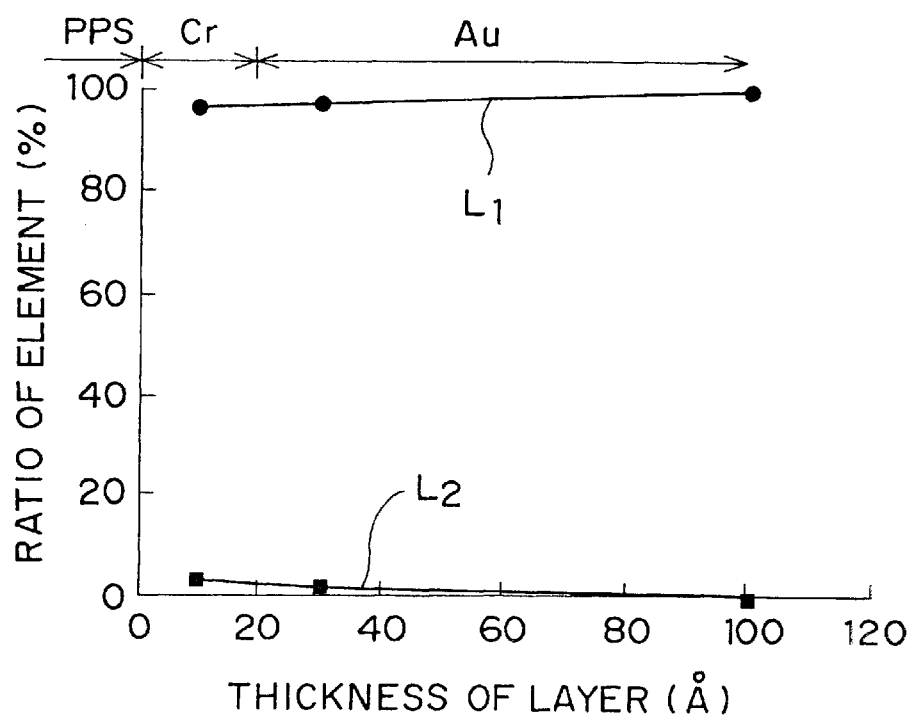
FIG. 6 is a graph showing profiles of Cr content and Au content in the surface electrode, in the depth wise direction.

FIG. 6 shows profiles of Cr content and Au content of the surface electrode 7 in the depth wise direction, the profiles being obtained from the above-mentioned measurements. In FIG. 6, the lines $L_1$ and $L_2$ denote the Au content and Cr content in the surface electrode 7, respectively. It may be understood that metal elements, each of which originally should exist in only any one layer, are mixed together in the surface electrode 7. Although the portion near the drift layer 6, of the surface electrode 7, which is required to have high adhesion, has a high Cr content as described above, it also includes a little Au which may be expected to highly improve the electron emitting efficiency. In consequence, the alloyed surface electrode 7 may have higher electron emitting efficiency in comparison with the surface electrode having a simple two-layer construction, while maintaining higher adhesion for the drift layer 6.

Figure 7:
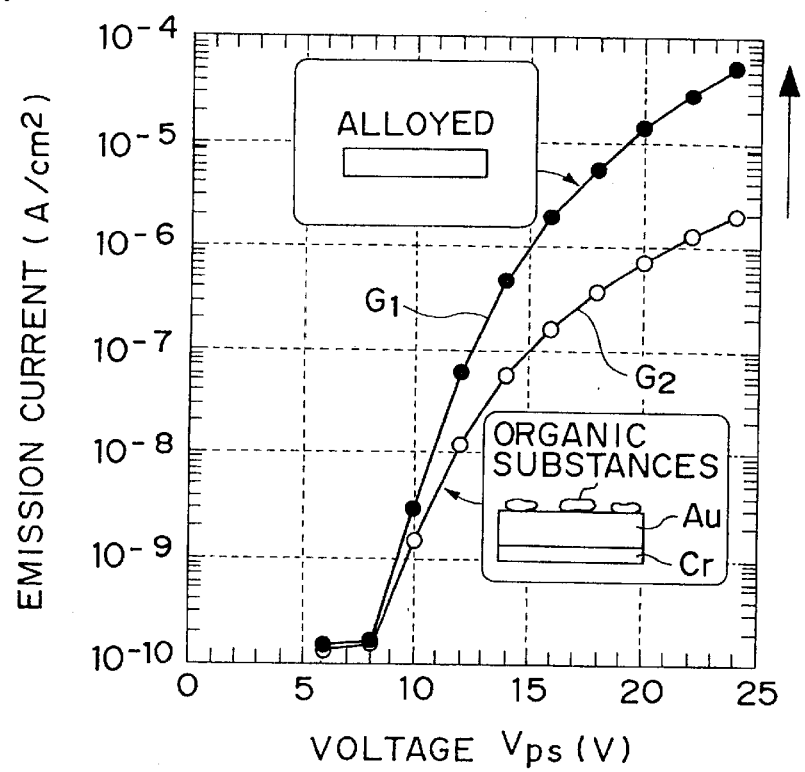
FIG. 7 is a graph showing the relation between emission current Ie and DC voltage Vps as to electron sources using surface electrodes composed of Au and Cr.

FIG. 7 shows the relation between the emission current Ie and DC voltage Vps as to two electron sources, each of which was manufactured for testing use. One of the two (hereinafter, referred to "Sample 1") has a surface electrode which was formed by alloying an intermediate film having a Cr layer and an Au layer while applying UV rays and ozone thereto (corresponding to Graph $G_1$). The other (hereinafter, referred to "Sample 2") has a surface electrode composed of the above-mentioned intermediate film itself, to which UV rays nor ozone were not applied (corresponding to Graph $G_2$). According to FIG. 7, it may be understood that Sample 1 according to the present invention has a much higher (about double order higher) electron emitting efficiency in comparison with Sample 2. The reason may be because electron scattering in the surface electrode is less while adhesion between the surface electrode and the drift layer is higher as to Sample 1. Therefore, in order to improve the electron emitting efficiency of the electron source, it may be very effective to form the surface electrode by alloying the intermediate film while applying ozone thereto.

Figure 8:
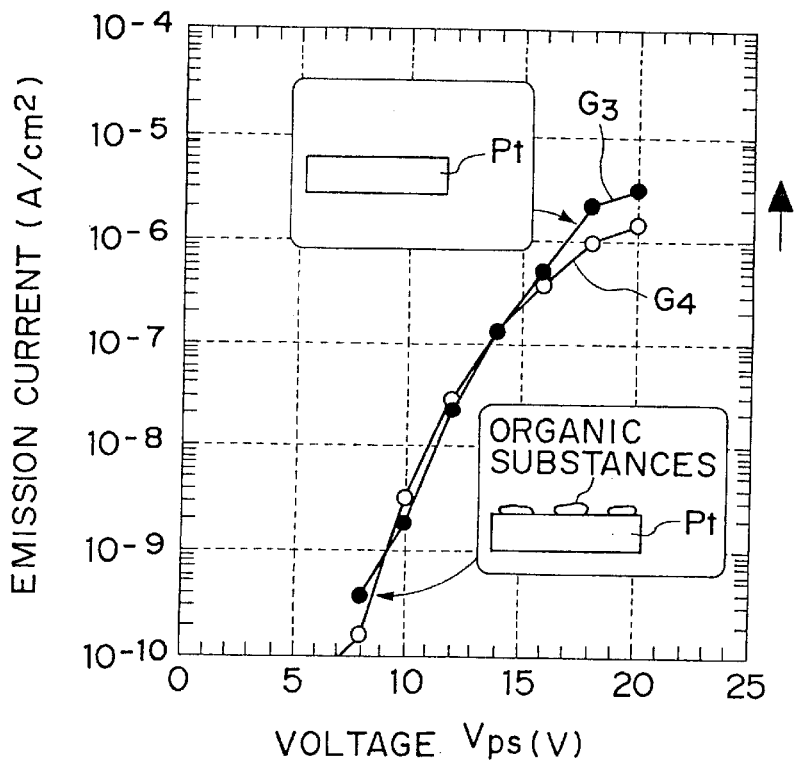
FIG. 8 is a graph showing the relation between emission current Ie and DC voltage Vps as to electron sources using the surface electrodes composed of Pt.

FIG. 8 shows the relation between the emission current Ie and DC voltage Vps as to further two electron sources, each of which was also manufactured for testing use. One of the two (hereinafter, referred to "Sample 3") has a surface electrode composed of Pt, to which ozone was applied (corresponding to Graph $G_3$). The other (hereinafter, referred to "Sample 4") has a surface electrode composed of Pt, to which ozone was not applied (corresponding to Graph $G_4$). According to FIG. 8, it may be understood that Sample 3 has a little higher electron emitting efficiency in comparison with Sample 4. Thus it may be understood that the effect of the ozone application for improving the electron emitting efficiency is not so larger in comparison with the case that the surface electrode is alloyed.

Because the outermost layer of the intermediate film 7" is composed of Au in each of the above-mentioned embodiments, its resistance to oxidation may be improved so that its stability for the lapse of time may be improved. Instead of Au, however, Pt, Cu or Ag may be used. Further, in each of the above-mentioned embodiments, the intermediate film 7", in which the outermost layer is composed of Au while the innermost layer (layer contacting the drift layer 6) is composed of Cr, is alloyed during the stabilizing process so that both of higher electron emitting efficiency and higher adhesion may be achieved. Instead of the above-mentioned metal materials, however, there may be used Pt, W, Ru, Ir, Al, Sc, Ti, V, Mn, Fe, Co, Ni, Cu, Zn, Ga, Y, Zr, Nb, Mo, Te, Rh, Pd, Ag, Cd, Ln, Sn, Ta, Re, Os, Tl Pb, La, Ce, Pr, Nd, Pm, Sm, Eu, Gd, Tb, Dy, Ho, Er, Tm, Yb, Lu etc., oxides of these metals, combination of some of these metals or the like.

Meanwhile, in the stabilizing process, an intermediate film composed of three metal layers may be alloyed. If the intermediate film is composed of three metal layers, it is preferable that the innermost metal layer (nearest to the drift layer 6) is composed of a metal having higher adhesion and/or higher sublimation enthalpy while the outermost metal layer (furthest to the drift layer 6) is composed of a metal having a lower density of states in an energy region near energy of the emitted electrons.

The process and materials for forming the drift layer 6, on which the surface electrode 7 is formed, need not to be limited to those of the above-mentioned embodiments. Therefore the drift layer 6 may be formed using other process and materials. For example, in the step for forming the surface electrode 7 according to each of the above-mentioned embodiments, at first the intermediate film 7" is formed and then it is alloyed, in the stabilizing process. However, in the stabilizing process, materials in the intermediate film 7" may be chemically combined to form a compound.

In each of the above-mentioned embodiments, the intermediate film 7" is formed by stratifying (stacking) the layers, each of which is composed of a single element, using the sputtering process or vacuum deposition process. However, in stead of the above, at least two materials including the above-mentioned first and second materials may be attached to the drift layer 6 by simultaneously sputtering or depositing the materials onto the drift layer 6. Alternatively, the surface electrode 7 may be formed by sputtering a target, in which at least two materials including the above-mentioned first and second materials are alloyed or chemically combined together, onto the drift layer 6. Meanwhile, the surface electrode 7 may be formed by depositing a substance, in which at least two materials including the above-mentioned first and second materials are alloyed or chemically combined together, onto the drift layer 6.

The technical conception of the present invention may be also applied to many other electron sources of MIM type or MOS type. In the case of the MIM type electron source having the construction of (metal film)-(insulating film)-(metal film), one metal film constitutes (acts as) the base electrode, while the other metal film constitutes the surface electrode. Meanwhile, the insulating film constitutes the drift layer, through which electrons pass from the base electrode to the surface electrode due to the electrical field generated by applying a voltage between the base electrode and the surface electrode in such a manner that the surface electrode has a higher potential.

On the other hand, in the case of the MOS type electron source having the construction of (metal film)-(oxide film)-(semiconductor layer), the semiconductor layer constitutes the base electrode, while the metal film constitutes the surface electrode. Meanwhile, the oxide film constitutes the drift layer, through which electrons pass from the base electrode to the surface electrode due to the electrical field generated by applying a voltage between the base electrode and the surface electrode in such a manner that the surface electrode has a higher potential.

Although the present invention has been described in relation to particular embodiments thereof, many other variations and modifications will become apparent to those skilled in the art. It is preferred, therefore, that the present invention be limited not by the specific disclosure herein, but only by the appended claims.

What is claimed is:

1. A field emission-type electron source comprising:
    an electrically conductive substrate;
    a strong electric field drift layer formed on a surface of said electrically conductive substrate; and
    an electrically conductive thin film formed on said strong electric field drift layer, in which
    electrons injected into said strong electric field drift layer from said electrically conductive substrate, drift in said strong electric field drift layer to be emitted outward through said electrically conductive thin film by applying a voltage between said electrically conductive thin film and said electrically conductive substrate in such a manner that said electrically conductive thin film acts as a positive electrode against said electrically conductive substrate, wherein
    said electrically conductive thin film has low density of states in an energy region near energy of the emitted electrons, and at least one of high adhesion for said strong electric field drift layer and high sublimation enthalpy.

2. A field emission-type electron source comprising:
    a first electrode;
    a surface electrode composed of an electrically conductive thin film, said surface electrode acting as a second electrode; and
    a strong electric field drift layer disposed between said first electrode and said surface electrode, in which electrons pass through from said first electrode to said surface electrode due to an electrical field which is generated when a voltage is applied between said first electrode and said surface electrode in such a manner that said surface electrode has a higher electrical potential in comparison with said first electrode, wherein
    said electrically conductive thin film includes a first material having at least one of high adhesion for said strong electric field drift layer and high sublimation enthalpy, and a second material whose density of states in the energy region near energy of the emitted electrons is lower than that of said first material, the density of states of said thin film in the energy region near energy of the emitted electrons being lower than that of said first material.

3. The field emission-type electron source according to claim 1, wherein said electrically conductive thin film comprises a metal layer including a first material having at least one of high adhesion for said strong electric field drift layer and high sublimation enthalpy, and a second material whose density of states in the energy region near energy of the emitted electrons is lower than that of said first material, the density of states of said metal layer in the energy region near energy of the emitted electrons being lower than that of said first material.

4. The field emission-type electron source according to claim 3, wherein said strong electric field drift layer is composed of a porous material including, at least,
    polycrystalline silicon columns,
    fine crystalline silicon particles of nanometer order scale interposed among the polycrystalline silicon columns, and
    insulating films formed on surfaces of the fine crystalline silicon particles, each of the insulating films having thickness smaller than the crystalline particle diameter of the fine silicon particle.

5. The field emission-type electron source according to claim 3, wherein said electrically conductive thin film is composed of a metal layer including at least two metal materials, in which electrons in d-orbits of said metal materials produce a hybrid orbit so as to lower the density of states of the metal layer in the energy region near energy of the emitted electrons.

6. The field emission-type electron source according to claim 3, wherein said metal layer includes a metal material in which a first metal, which has high adhesion for said strong electric field drift layer and/or high sublimation enthalpy, and a second metal, whose density of states in the energy region near energy of the emitted electrons is low, are mixed together in an atomic level to form an alloy, or chemically combined together to form a compound.

7. The field emission-type electron source according to claim 6, wherein said metal layer includes at least Au.

8. The field emission-type electron source according to claim 6, wherein said metal layer includes at least Cr.

9. A method of manufacturing a field emission-type electron source having:
    an electrically conductive substrate;
    a strong electric field drift layer formed on a surface of said electrically conductive substrate; and
    an electrically conductive thin film formed on said strong electric field drift layer, in which
    electrons injected into said strong electric field drift layer from said electrically conductive substrate, drift in said strong electric field drift layer to be emitted outward through said electrically conductive thin film by applying a voltage between said electrically conductive thin film and said electrically conductive substrate in such a manner that said electrically conductive thin film acts as a positive electrode against said electrically conductive substrate, wherein
said electrically conductive thin film includes a metal layer having at least a first metal which has high adhesion for said strong electric field drift layer and/or high sublimation enthalpy, and a second metal whose density of states in an energy region near energy of the emitted electrons is low, said method comprising the steps of:
attaching at least said first and second metals to said strong electric field drift layer; and
performing a stabilizing treatment for alloying or chemically combining said first and second metals together to form said metal layer.

10. The method according to claim 9, wherein said stabilizing treatment is performed by applying UV rays to a surface of said metal disposed at an outermost position.

11. The method according to claim 9, wherein said stabilizing treatment is performed while applying ozone to a surface of said metal disposed at an outermost position.

12. The method according to claim 9, wherein said stabilizing treatment is performed by applying UV rays to a surface of said metal layer disposed at an outermost position while heating said metal layer.

13. The method according to claim 9, wherein said stabilizing treatment is performed by applying UV rays and ozone to a surface of said metal layer disposed at an outermost position while heating said metal layer.

14. The method according to claim 9, wherein said first and second metals are attached to said strong electric field drift layer by stratifying said first and second metals onto said strong electric field drift layer.

15. The method according to claim 14, wherein the stratified first metal is formed on said strong electric field drift layer while the stratified second metal is formed at a position nearest to said surface electrode, during said stratifying.

16. The method according to claim 14, wherein said first and second metals are stratified using an alternate sputtering process.

17. The method according to claim 14, wherein said first and second metals are stratified using a vapor deposition process.

18. The method according to claim 9, wherein said first and second metals are attached to said strong electric field drift layer in such a state that said first and second metals are mixed together.

19. The method according to claim 18, wherein said first and second metals are attached to said strong electric field drift layer by simultaneously sputtering said first and second metals onto said strong electric field drift layer.

20. The method according to claim 18, wherein said first and second metals are attached to said strong electric field drift layer by simultaneously depositing said first and second metals onto said strong electric field drift layer.

21. A method of manufacturing a field emission-type electron source comprising:
an electrically conductive substrate;
a strong electric field drift layer formed on a surface of said electrically conductive substrate; and
an electrically conductive thin film formed on said strong electric field drift layer, in which
electrons injected into said strong electric field drift layer from said electrically conductive substrate, drift in said strong electric field drift layer to be emitted outward through said electrically conductive thin film by applying a voltage between said electrically conductive thin film and said electrically conductive substrate in such a manner that said electrically conductive thin film acts as a positive electrode against said electrically conductive substrate, wherein
said electrically conductive thin film includes a metal layer in which at least a first metal, which has high adhesion for said strong electric field drift layer and/or high sublimation enthalpy, and a second metal, whose density of states in an energy region near energy of the emitted electrons is low, are mixed together in an atomic level to form an alloy or chemically combined together to form a compound while the electrons in d-orbits of said metals produce a hybrid orbit, said method comprising:
attaching vapor or fine particles made from a source or target in which said first and second metals have been alloyed or chemically combined, to said strong electric field drift layer to thereby form said metal layer.

22. The method according to claim 21, wherein said fine particles of said target are attached to said strong electric field drift layer by sputtering said target onto said strong electric field drift layer.

23. The method according to claim 21, wherein said vapor of said target is attached to said strong electric field drift layer by depositing said target onto said strong electric field drift layer.

24. A method of manufacturing a field emission-type electron source comprising:
an electrically conductive substrate;
a strong electric field drift layer formed on a surface of said electrically conductive substrate; and
an electrically conductive thin film formed on said strong electric field drift layer, in which
electrons injected into said strong electric field drift layer from said electrically conductive substrate, drift in said strong electric field drift layer to be emitted outward through said electrically conductive thin film by applying a voltage between said electrically conductive thin film and said electrically conductive substrate in such a manner that said electrically conductive thin film acts as a positive electrode against said electrically conductive substrate, wherein
said electrically conductive thin film includes a metal layer in which at least a first metal, which has high adhesion for said strong electric field drift layer and/or high sublimation enthalpy, and a second metal, whose density of states in an energy region near energy of the emitted electrons is low, are mixed together in an atomic level to form an alloy, or chemically combined together to form a compound while the electrons in d-orbits of said metals produce a hybrid orbit, said method comprising:
attaching at least said first and second metals, which are formed in such small sizes that said first and second metals can be naturally alloyed or chemically combined together, to said strong electric field drift layer to form said metal layer.

25. The method according to claim 24, wherein said first and second metals are attached to said strong electric field drift layer in such a state that thin layers of said first metal and thin layers of said second metal are alternately stratified.

26. The method according to claim 24, wherein said first and second metals are attached to said strong electric field drift layer in such a state that fine particles of said first metal and fine particles of said second metal are mixed together.

* * * * *